(12) United States Patent
Lawson

(10) Patent No.: US 7,211,188 B2
(45) Date of Patent: May 1, 2007

(54) SOLAR POWERED AQUARIUM

(76) Inventor: Jeffrey G. Lawson, 229 Willow Ave., So. San Francisco, CA (US) 94080

( * ) Notice: Subject to any disclaimer, the term of this patent is extended or adjusted under 35 U.S.C. 154(b) by 0 days.

(21) Appl. No.: 11/166,584

(22) Filed: Jun. 27, 2005

(65) Prior Publication Data

US 2006/0289345 A1 Dec. 28, 2006

(51) Int. Cl.
*A01K 63/04* (2006.01)

(52) U.S. Cl. .............. 210/167.21; 210/232; 210/416.2; 119/245

(58) Field of Classification Search .............. 210/169, 210/232, 416.1, 416.2, 167.01, 167.21; 119/245
See application file for complete search history.

(56) References Cited

U.S. PATENT DOCUMENTS

| | | | | |
|---|---|---|---|---|
| 3,273,717 | A | * | 9/1966 | Canterbury ................. 210/169 |
| 4,601,821 | A | * | 7/1986 | Sherman et al. ............ 210/169 |
| 5,401,401 | A | * | 3/1995 | Hickok et al. .............. 210/169 |
| 5,527,453 | A | * | 6/1996 | Hachima .................... 210/150 |
| 6,676,837 | B2 | * | 1/2004 | Keeton, Jr. ................. 210/620 |
| 2002/0104807 | A1 | * | 8/2002 | Keeton, Jr. ................. 210/747 |
| 2004/0173542 | A1 | * | 9/2004 | Porat ......................... 210/760 |
| 2006/0162667 | A1 | * | 7/2006 | Papadoyianis et al. ...... 119/223 |

FOREIGN PATENT DOCUMENTS

JP P2000-260494 * 9/2000

* cited by examiner

*Primary Examiner*—Fred G. Prince
(74) *Attorney, Agent, or Firm*—Thomas R. Lampe

(57) ABSTRACT

Solar powered aquarium with a water holding vessel suitable for use as a table top aquarium powered by one or more solar cells. The aquarium vessel includes a secondary bottom held up from the main bottom by a side wall. A small cylinder is mounted between the main bottom and the secondary bottom. A downwardly extending skirt houses a DC motor mounted below the main bottom. A ferrous metal plate mounted to the shaft of the DC motor causes a magnetic spinning member located within the small cylinder to rotate. Apertures in the small cylinder and the side wall of the secondary bottom allow water to be drawn into the small cylinder and out the side wall. Gravel located in the bottom of the vessel traps debris as the water is drawn through it. Outwardly attached solar cells provide power for recharging circuit and attached motor.

3 Claims, 3 Drawing Sheets

SOLAR POWERED AQUARIUM

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of aquariums and more specifically to a solar powered aquarium.

Aquariums are well known. Small aquariums for holding fish and other water born animals are an enjoyable addition to a home or office. Watching the swimming patterns and other habits of water born creatures through the clear glass or plastic walls of a table top aquarium can be quite entertaining and interesting.

millions of table top aquariums have been sold since their introduction over fifty years ago.

Aquariums can be very simple affairs such as a glass bowl with gravel at the bottom, to very complex designs with water filters, heaters, lights and other equipment needed to keep the water environment ideal for the fish or other animals that live in it. Water filtration in particular has been shown to be a most important component in the process of keeping an aquarium a health place for fish to live in as well as helping to maintaining water clarity for optimal viewing pleasure.

Unfortunately, water filters require some sort of pumping means that requires household power. This means that the table top aquarium must be connected by a pair of insulated wires to a power source. The need to plug in the filtration pump can be restrictive to where the aquarium can be placed. For example, if a person wanted to place a small aquarium on his of her desk top, it would mean that an unsightly power cord would be visible trailing across the desk to the aquarium. Additionally, many filtration pumps are somewhat noisy because traditional pumps include diaphragms or pistons that oscillate quickly and somewhat loudly.

BRIEF SUMMARY OF THE INVENTION

The primary object of the invention is to provide a table top aquarium that has a water filtration means that does not require the user to use normal household power.

Another object of the invention is to provide a table top aquarium whose filtration system is relatively quiet.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed solar powered aquarium comprising: a water holding container suitable for use as a table top aquarium, one or more solar cells, a standard solar cell recharging circuit including one or more rechargeable batteries, said aquarium container including a secondary bottom held up from the main bottom by a side wall, a centrally located cylindrical portion mounted between said main bottom and said secondary bottom, a downwardly extending skirt located below said main bottom, a centrally located DC motor mounted below said main bottom and within said skirt, a ferrous metal plate mounted to the shaft of said DC motor, a magnetic spinning member located within said centrally located cylinder, said magnetic spinning member located in close proximity to said metal plate so that the turning of said metal plate induces the rotation of said spinning member, said recharging circuit and said rechargeable batteries located within said skirt area, and said solar cells mounted on an outside surface of said aquarium.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
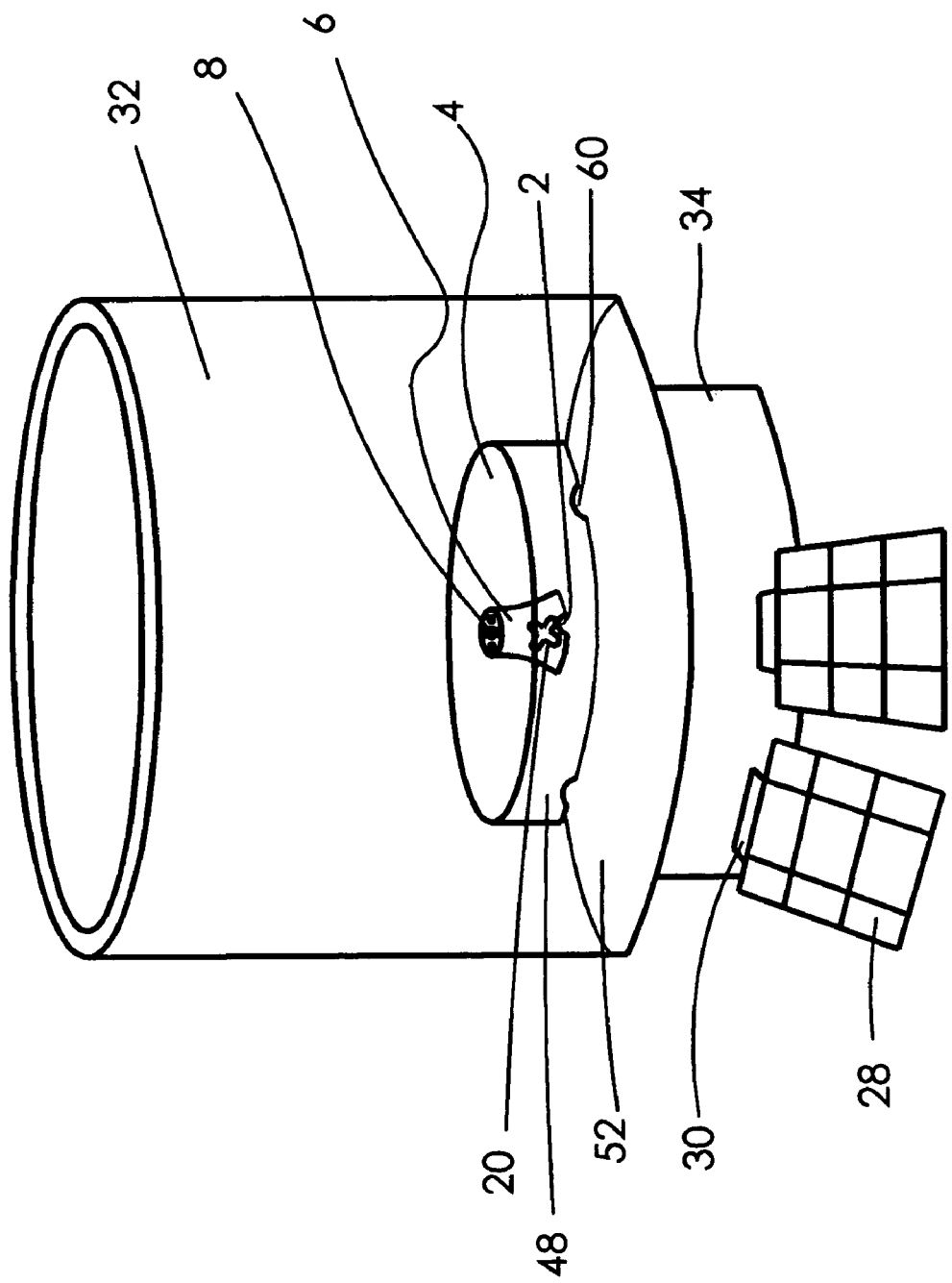
FIG. 1 is a perspective view of the invention.
Figure 2:
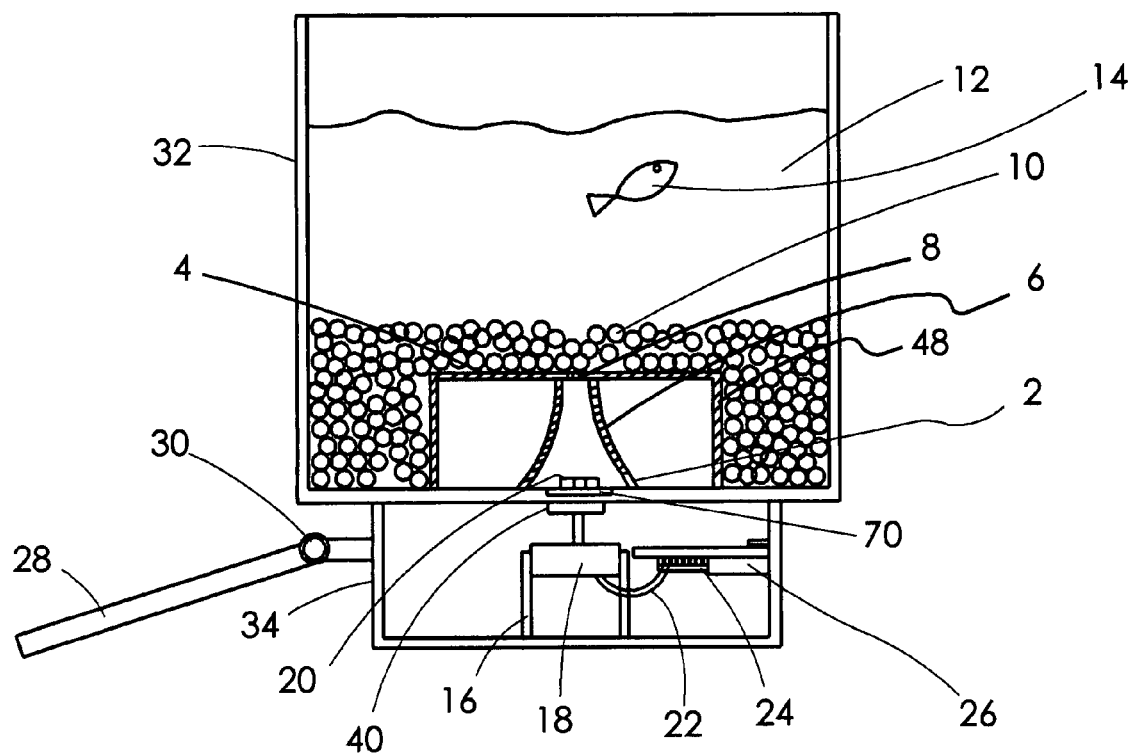
FIG. 2 is a side section view of the invention.

Referring now to FIG. 1 we see a perspective view of the invention. A main water retaining vessel comprised of side wall 32 and integral base plate 52 is adaptable of housing a plurality of fish or other waterborne animals or plants. The construction of the vessel or container 32 is made of clear material such as glass or acrylic type plastic. A centrally located secondary base plate 4 is supported by side wall 48 which is in turn attached to base plate 52. Side wall 48 has a plurality of notches or openings at the bottom thereof, one of which is designated by reference number 60, which allow passage of water therethrough. Between base plate 52 and secondary base plate 4 is a small cylindrical member 6. A plurality of small apertures 8 allow water to flow from the top of secondary base plate 4 into small cylinder 6. Aperture 2 at the bottom of small cylinder 6 allows water to exit the cylinder 6. The spinning of magnetic stirring member 20 causes a pumping action that causes water to be drawn into apertures 8 and then out through aperture 2. The total area of apertures 8 is approximately equal to the area of aperture 2 so that no excess water pressure is built up within cylinder 6 thereby allowing for the smooth flow of water into and out of the cylinder 6. Solar panels 28 power a small DC motor 18 located within bottom skirt 34. The motor shaft terminates in a ferrous metal plate 40 as shown in the section view in FIG. 2. Vessel base plate 52 is relatively thin, approximately sixty thousandths of an inch, so that magnetic attractive force of magnetic stirring member 20 can be felt on the spinning metal plate 2.

Figure 3:
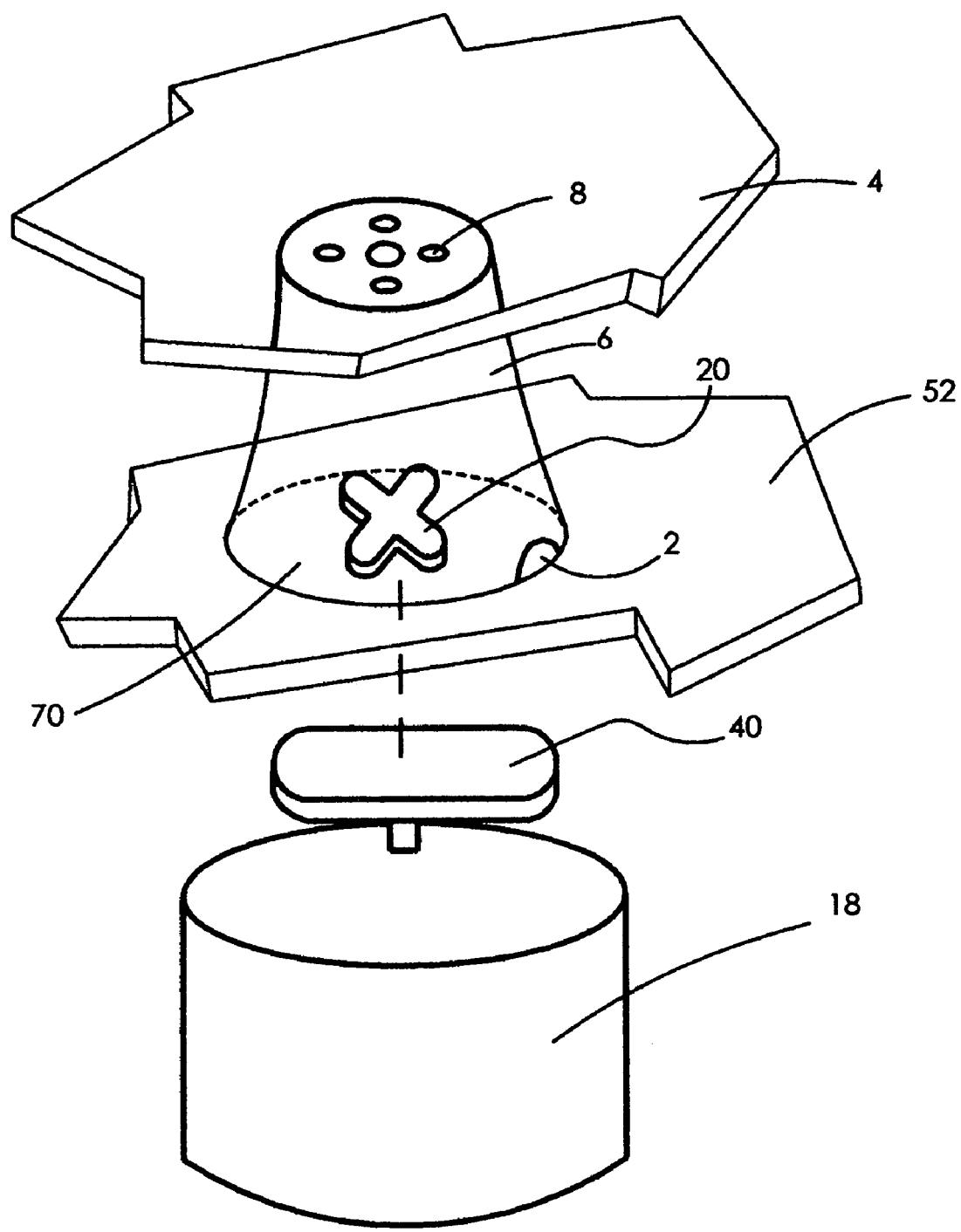
FIG. 3 is an exploded view of the magnetic pump portion of the invention.

FIG. 3 shows a more detailed view of the pump mechanism. Magnetic stirring member 20 is known in the chemical mixing industry as a standard method of mixing liquids within a sealed glass beaker or the like, but is not typically used as a pumping means as I have shown in the present invention. The addition of a thin foam plastic layer 70 under magnetic stirrer 20 helps create a more silent spinning action so that when the present invention is place in a quiet environment such as a persons desk, or other location, the sound of the spinning magnetic member 20 is not objectionable. Standard aquarium pumps that use reciprocating pistons or diaphragms tend to produce a rather annoying buzzing noise. Referring back to FIG. 2 we see that The DC motor 18 is held under the base plate 52 by support member 16. Wires 22 connect the motor 18 to a charging circuit 24 that includes rechargeable batteries 26, the spinning metal plate 40 can be seen just under base plate 52 but not touching it. Because the force to rotate the magnetic spinning member 20 is so small, motor 18 can use very little power, approximately one hundred and fifty milliamps, which can be fairly easily generated by solar panels 28 in moderate daylight. My experiments show that exposure to direct sunlight is not necessary, and that enough electrical power is stored in the rechargeable batteries 26 during the day that the motor 18 continues to spin through the night on the stored energy.

The pumping action caused by magnetic spinner 20 causes fish 14 related debris in the water 12 to be drawn into the gravel bed 10 where it is trapped. Periodically, the user has to exchange the debris filled gravel for new clean gravel. The solar cells 28 are mounted on frictional hinges 30 so that they can be optimally adjusted to face a light source. Additionally, the solar panels can be folded to be close to the skirt for purposes. The above described and illustrated aquarium allows a person to place the unit on a surface such as a desk or table, and to have a means to keep the water in the aquarium clean without the need to plug the unit into a standard household power source. The unit is also extremely quiet so that it is not bothersome when a person is in close proximity to it for long periods of time such as when sitting at an office desk.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A solar powered aquarium of unitary construction comprising, in combination:
   a water retaining vessel including a first base plate and a first wall extending upwardly from the first base plate and defining therewith a water retaining vessel interior;
   a second wall positioned on said first base plate and extending upwardly therefrom into said water vessel retaining interior;
   a second base plate supported by said second wall and positioned above said first base plate, said second wall being spaced inwardly of said first wall and said second plate defining at least one second plate opening;
   water flow path defining structure having an upper end and a lower end within the confines of said second wall and spaced therefrom positioned on said first plate and defining a water flow path leading from said at least one second plate opening, said water flow path defining structure defining at least one aperture at said lower end;
   a rotatable magnetically drivable pump member disposed within said water flow path between said first plate and said second plate adjacent to said at least one aperture;
   a base supporting said first plate and disposed thereunder;
   a DC motor disposed within said base;
   a rotatable structural element attached to said DC motor under said first plate magnetically coupled to said magnetically drivable pump member and rotatable by said DC motor to rotate said magnetically drivable pump member through the magnetic coupling existing between said rotatable structural element and said magnetically drivable pump member, rotation of said magnetically drivable pump member causing the flow of water in said water retaining vessel downwardly from said at least one second plate opening through said water flow path defining structure and outwardly through said at least one aperture at the lower end of said water flow path defining structure and through said second wall to promote entrapment of debris in said water retaining vessel interior in a gravel bed located in said water relating vessel interior; and
   at least one externally mounted solar panel operatively associated with said DC motor to energize said DC motor.

2. The solar powered aquarium according to claim 1 wherein said at least one solar panel is adjustably mounted to adjust to different sun light directions when in use and alternatively for movement to a non-use position.

3. The solar powered aquarium according to claim 1 wherein the total area of said at least one aperture and the total area of said at least one second plate opening are substantially equal.

* * * * *